United States Patent [19]
Provi

[11] 3,921,306
[45] Nov. 25, 1975

[54] CARPENTER'S AND MASON'S LEVEL
[75] Inventor: Mike A. Provi, Rockford, Ill.
[73] Assignee: Pro Products, Inc., Rockford, Ill.
[22] Filed: May 31, 1974
[21] Appl. No.: 474,935

Related U.S. Application Data
[63] Continuation-in-part of Ser. No. 363,978, May 25, 1973, abandoned.

[52] U.S. Cl. ............................. 33/379; 33/350
[51] Int. Cl.² ................................. G01C 9/28
[58] Field of Search .......................... 33/370–373, 33/379, 381, 382, 383, 369, 112, 391, 350

[56] References Cited
UNITED STATES PATENTS
| | | | |
|---|---|---|---|
| 2,467,928 | 4/1949 | Bolter | 33/137 R |
| 3,029,524 | 4/1962 | Vaida et al. | 33/381 |

FOREIGN PATENTS OR APPLICATIONS
| | | | |
|---|---|---|---|
| 1,913,336 | 10/1969 | Germany | 33/112 |

Primary Examiner—Richard E. Aegerter
Assistant Examiner—Charles E. Phillips
Attorney, Agent, or Firm—Morsbach & Pillote

[57] ABSTRACT

A carpenter's and mason's level with a composite metal and plastic body. The body includes a metal frame with four relatively parallel rails forming the corners of the body and an internal metal web structure interconnecting the rails and forming a longitudinal channel at each side of the body, a rigid foamed plastic fills the channels and the plastic in the several channels is interconnected through openings in the web structure to form a unitary plastic body. The outer faces of the plastic body are offset inwardly of the outer faces of the rails so that the rails form the work contacting surfaces of the level body. The level vials are mounted in openings in the body and may be mounted on holders attached directly to the metal frame.

14 Claims, 20 Drawing Figures

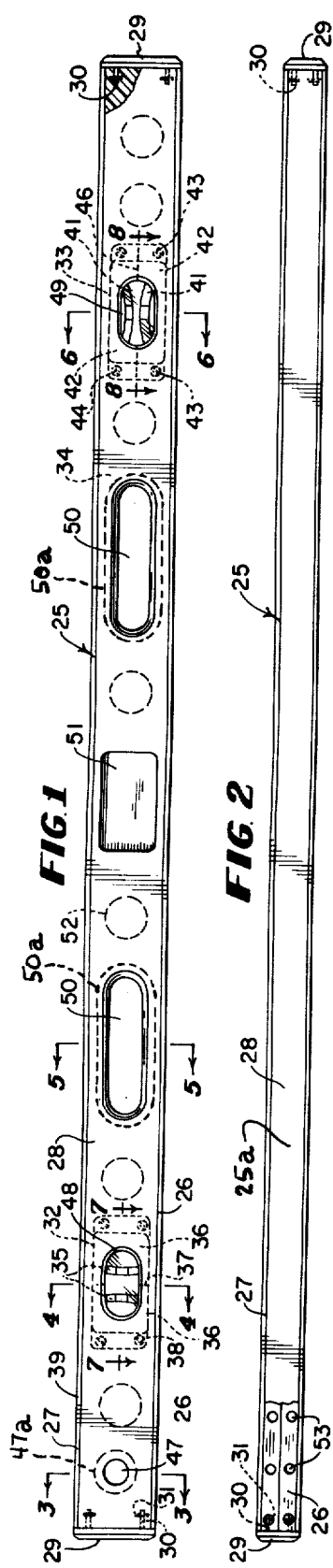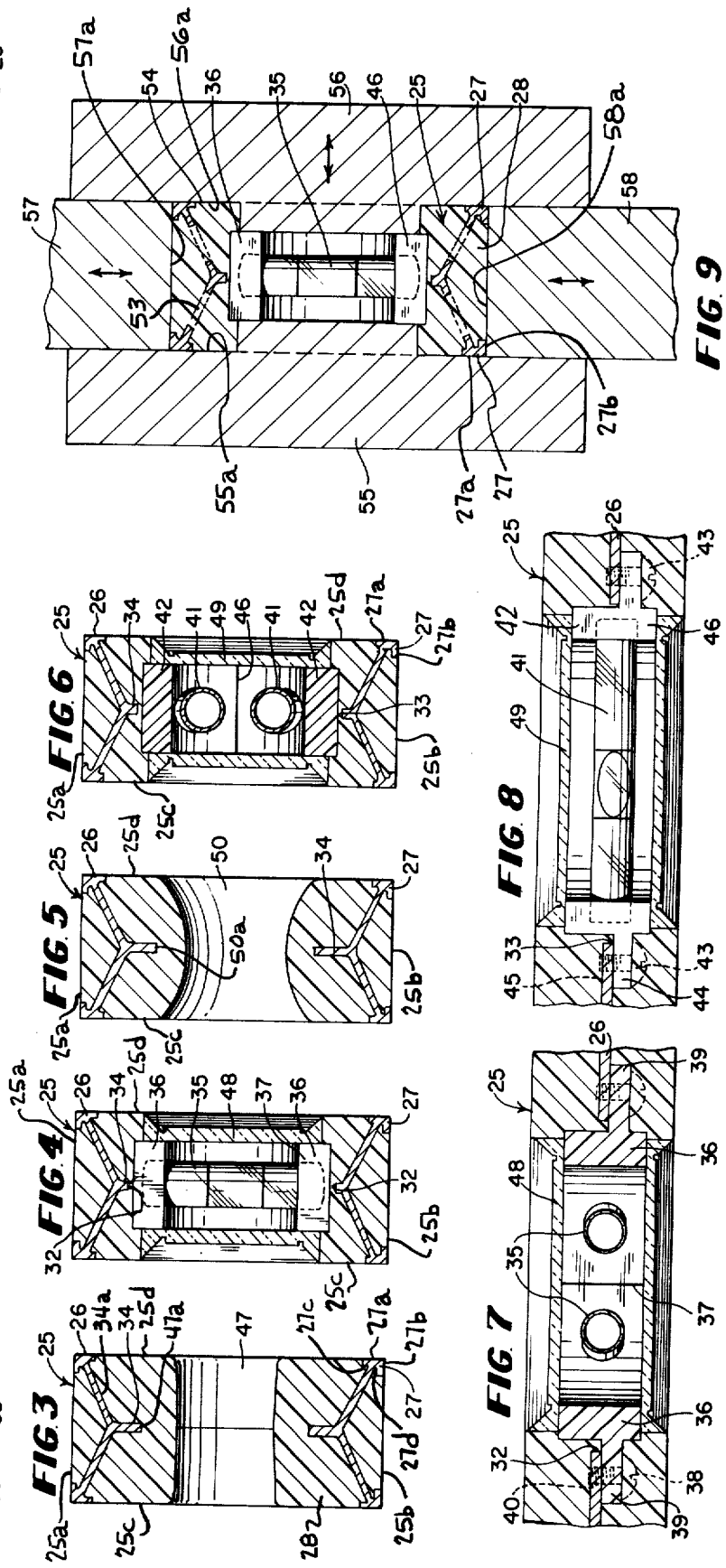

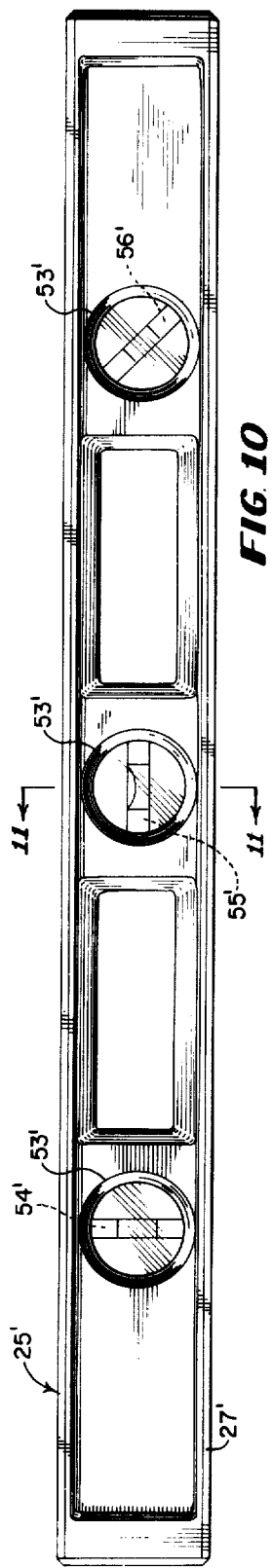
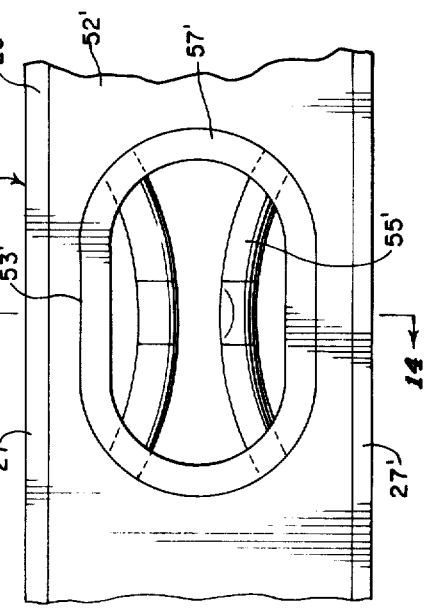
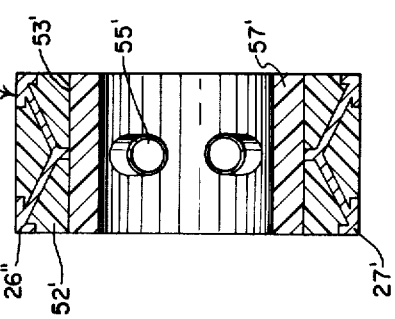
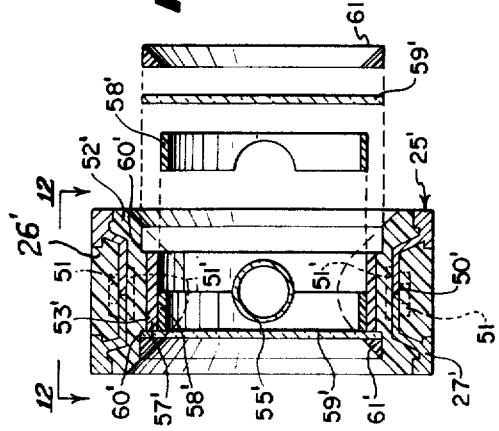
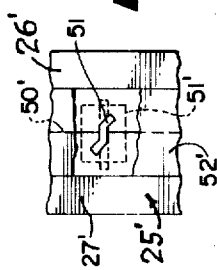

CARPENTER'S AND MASON'S LEVEL

This is a continuation-in-part of my copending application for Carpenter's and Mason's Level, Ser. No. 363,978, filed May 25, 1973 now abandoned.

BACKGROUND

Carpenter's and mason's levels are made with relatively long level bodies, usually in a range from about 2 to 4 feet in length, with some level bodies even longer. The level bodies must have work engaging faces that define a planar work engaging surface and the level bodies must be capable of retaining a planar work engaging surface under the impacts and stresses encountered in normal use. Moreover, since the carpenter's and mason's levels are handled manually and must be lifted into and out of engagement with the work being leveled many times in a normal work day, it is very important that the overall weight of the level be kept as low as possible consistent with maintaining adequate strength and rigidity.

It has been the common practice for many years to make carpenter's and mason's levels almost entirely from wood, with the level vials set in openings in the work body. Wood has a density of only about 35 to 40 pounds per cubic foot and level bodies formed of wood are generally considered to have desirable characteristics in that they are relatively light in weight, comfortable to handle even in cold weather, and resist deformation of the work engaging surface under the impacts and stresses encountered in normal use. However, wood does absorb moisture and is subject to warping. Further, wood does not have good abrasion resistance and metal wear strips were sometimes affixed to the corners of wood levels to reduce wear on the work engaging faces of the wood level. Moreover, wood levels are quite expensive to make. High quality wood is becoming more difficult and expensive to obtain and there is a substantive amount of scrap or waste that occurs not only when cutting the level bodies from the wood stock, but even after machining of the level bodies is completed because of warping and cracking of some of the completed level bodies caused by irregular grain, moisture etc. In addition, the manufacture of the wood levels requires many operations in drying the wood and machining the wood to form an accurate level body which further increases the cost of making wood levels.

Levels have also been made with all metal bodies, usually of aluminum with an I-beam configuration and with the level vials mounted on the web portion of the I-beam. However, aluminum has a density more than four times that of wood used in making all wood levels and it was accordingly necessary to use relatively thin webs and flanges in such metal level bodies to keep the overall weight within acceptable limits. The flanges on such all metal levels were exposed and unsupported at their outer edges and even a moderate blow on one of the flanges that only produced a slight bending of the flange could cause a serious deformation of the work engaging surface. Further, all metal levels were not as comfortable to handle as wood levels. The I-beam configuration presented relatively sharp corners and the high thermal conductivity of the metal made the levels cold and uncomfortable to handle in cold weather. In addition, concrete tends to adhere to aluminum and aluminum levels do not "float" on a wet concrete mixture, so that masons do not like aluminum levels for leveling concrete surfaces during laying of the same.

SUMMARY OF THE INVENTION

It is the object of the present invention to overcome the disadvantages of the prior levels by producing a carpenter's and mason's level having a composite metal and plastic body which is light in weight, economical to make and resistant to deformation in normal use.

Accordingly, the present invention provides a carpenter's and mason's level in which the level body includes a metal frame having four relatively parallel rails arranged in a transversely rectangular array and an internal metal web structure interconnecting the four rails and defining a channel along each side of the array. A rigid foamed plastic fills the channels leaving the outer faces of the rails exposed to provide accurate work engaging surfaces. The rigid foamed plastic substantially encloses and supports the web structure of the metal frame to reduce the likelihood of deformation of the level body due to loading or impact. Moreover, the foamed plastic provides good thermal insulation on the metal frame so that the level is comfortable to handle, even in cold weather and the plastic body provides improved support for the level vials and also aids in sealing the enclose for the vials against the entrance of moisture. The foamed plastic is preferably selected to have a density sufficiently less than the density of wood such that the overall weight of the composite metal and foamed plastic body is about the same or even less than that of the comparable wood level. The outer faces of the plastic in the channels is advantageously offset inwardly from the outer faces of the rails whereby the plastic is out of contact with the work piece so that the irregularities in the surface of the plastic do not interfere with the leveling operation and the plastic surface is not subjected to wear and abrasion by the work being leveled. The rigid foamed plastic on the frame preferably has an essentially non-cellular outer skin to minimize adhesion of dirt and building materials such as cement and mortar to the level, and the outer surface is advantageously textured to simulate wood grain.

The level vials are mounted on the level body and may be mounted in holders directly on the metal frame or in openings formed in the plastic body.

The invention is illustrated in the accompany drawings, in which:

FIG. 1 is a side view of a carpenter's and mason's level made in accordance with my invention;

FIG. 2 is an edge view of FIG. 1 with a portion of the molded urethane body broken away at one end to reveal a portion of the perforated aluminum extrusion and also show how the end cap is secured;

FIGS. 3, 4, 5 and 6 are vertical sections on the correspondingly numbered lines of FIG. 1;

FIGS. 7 and 8 are horizontal sections on the correspondingly numbered lines of FIG. 1, showing the vial holders with their screw threaded mountings;

FIG. 9 is a section through the upper and lower parts of the mold between which the cavity that is filled with the urethane is defined;

FIG. 10 is a side view of another embodiment of a carpenter's level made in accordance with my invention, wherein the vials and vial holders are assembled in the level after molding of the body of urethane or other foamed plastic material;

FIG. 11 is a section on the line 11—11 of FIG. 10, showing parts on one side in disassembled relationship to the level to better illustrate the mode of assembly;

FIG. 12 is a detail on the line 12—12 of FIG. 11, showing how a two-part frame is held assembled with sheet-metal tie plates with a twist bar;

FIGS. 13 and 14 are lated views of another construction similar to FIG. 11, FIG. 14 being a section on the line 14—14 of FIG. 13.

Figure 15:
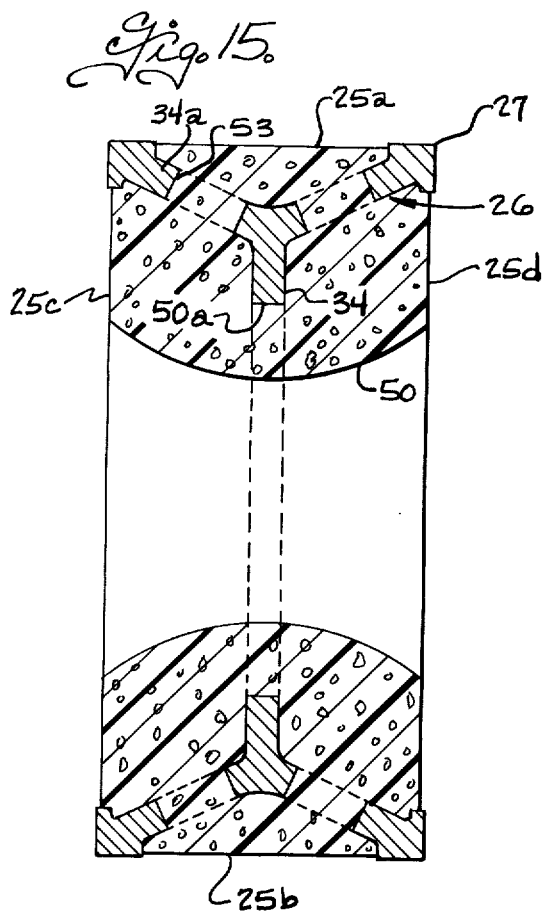
Figure 16:
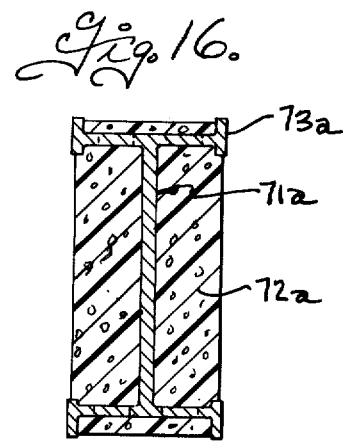
Figure 17:
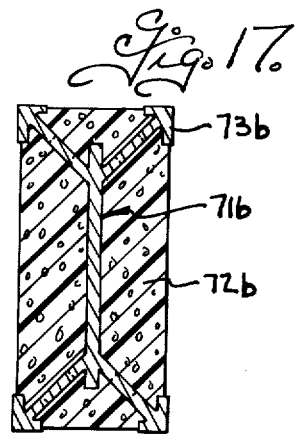

FIG. 15 is a transverse sectional view through a composite metal and plastic level body having a metal frame similar to the frame in FIGS. 1–9, and with the outer faces of the plastic body offset inwardly of the outer faces of the rails, and FIGS. 16 to 20 inclusive are all sections similar to FIGS. 3–6 showing other composite metal and plastic level bodies having metal stiffener frames of one, two and three-piece constructions utilizing aluminum extrusions and/or stampings.

Similar reference numerals are applied to corresponding parts throughout the views.

Referring first to the embodiment of FIGS. 1–8, the reference numeral 25 designates a carpenter's level having relatively parallel work engaging edge faces 25a, 25b and opposed relatively parallel side faces 25c, 25d. The level in general includes a metal frame 26 and a plastic body 28 molded on the frame. The metal frame 26 in the form of an aluminum extrusion, which provides four sharply defined right angle longitudinal corner portions or rails 27 at the four corners of a rectangular array and an internal metal web structure interconnecting the four rails and defining a channel at each side of the rectangular array. The internal web structure includes a central web 34 and four lengthwise extending flanges 34a that extend from the central web to a respective rail 27. The body 28 of the level is molded on this frame of rigid foamed plastic material with secitons of the plastic body substantially filling the channels at each of the four sides of the array to form a level body of generally rectangular cross section. The plastic body is preferably formed of high density rigid urethane foam and the density is preferably made somewhat less than the density of wood, in a range of about 20 to 30 pounds per cubic foot, so that the overall weight of the composite metal and plastic body is about the same or even slightly less than that of a wood level of like size. The foamed plastic body is also preferably formed with an essentially non-porour or non-cellular skin, commonly referred to as integral skin rigid foam, so as to minimize adhesion or dirt and building materials such as cement and mortar to outer surfaces of the plastic on the level body. Such high density rigid urethane foam has good adhesion to the metal frame, good dimensional stability at both elevated and low temperatures, high thermal insulation value, high compressive strength and low water absorption. The outer faces of the plastic are advantageously formed so as to be offset inwardly from the outer faces of the rails as best shown in FIG. 15, a slight distance of the order of 0.001 to 0.003 inches, so that any irregularities in the plastic body do not interfere with the level surfaces defined by the rails. Moreover, with this arrangement, the plastic faces are not in rubbing contact with the surface being leveled and are not abraded thereby. The outer surfaces are preferably textured and stained to simulate wood.

Molded end caps 29 of rubber of the like are advantageously molded integral with the plastic body 28 by being set in the opposite ends of the mold cavity at the outset of the molding operation so that the pins 30 that are molded integral with the caps can be anchored in the body of the level by metallic fasteners that require spreading to receive the pins 30. Rectangular holes 32 and 33 are provided in the central web 34 of the frame to receive level vials. Two level vials 35 are assembled in the hole 32 and are vertically disposed in holders 36 that have abutment on a transverse meeting line 37, the two holders being separately fastened by self-tapping screws 38, which extend through holes in lugs 39 on the holders and thread in holes 40 provided in the web, very little adjustment of the screws 38 sufficing to set the vials 35 very accurately and hold the same in accurately adjusted position preliminary to the urethane molding operation that defines the body 28 of the level. Another pair of vials 41 that are horizontally disposed in holders 42 are mounted in the other opening 33 are similarly fastened and adjusted by means of self-tapping screws 43 extending through holes in lug 44 on the holders and threaded in registering holes 45 provided in the web of the extrusion 26. In the case of the holders 42, they are separated along a horizontal line 46. As best shown in FIGS. 4, 6, 7 and 8, the plastic holders 36 and 42 define an annular frame of a size somewhat smaller than the respective openings 32 and 33 in the web 34 of the frame and the plastic body 28 extends through the openings 32 and 33 around the holders and interconnects the plastic in the channels along opposite sides of the body. Windows 48 and 49 of glass or clear plastic engage opposite ends of the plastic holders and provide good protection, as well as visibility, for the level vials 35 and 41, respectively.

A through-hole 47 is provided in one end of the level for hanging it up and to some extent as a convenience in carrying it and the through-hole 47 registers with and is somewhat smaller than an opening 47a in the frame. One or more elongated hand-holes are provided at 50 near the middle of the length of the level and the hand holes 50 also register with and are smaller than corresponding elongated openings 50a in the web of the metal frame. Thus, the channels at opposite sides of the level body are interconnected through openings 47a and 50a in the central web 34, as shown in FIGS. 3 and 5, as well as through openings 32 and 33 in the web 34. At regularly spaced intervals, additional large holes 52 can be provided in the web 34 of the frame 26 for free flow of the liquid urethane or other foamed plastic in the molding of the body of the level, and a much larger number of smaller holes 53 are distributed along the flange portions 34a of the frame 26 for the same purpose. Thus the channels at the four sides of the body are interconnected for free flow of the plastic material from one channel to an adjacent channel during molding of the plastic on the frame and, after hardening, the sections of plastic in the channels are interconnected through the openings in the frame into a rigid unitary plastic body. As will be seen from FIGS. 3–6, the rails 27 define outer faces 27a, 27b at right angles to each other and the rails have a width measured along the faces 27a and 27b in a line perpendicular to their length which is greater than the thickness of the respective flanges 34a and provide a transversely enlarged portion along the outer edges of each flange. The rails are also advantageously shaped to provide grooves 27c, 27d at their juncture with the flanges 34a, which grooves undercut the outer faces 27a, 27b respectively and open into the adjacent channels. The plastic in the channels fills the undercut grooves and is thus mechanically keyed to the frame. A recess 51 is provided in the side of the level body to receive a name plate.

In making the levels of the embodiment of FIGS. 1–8, preliminary molded assemblies are made of the vials 35 and 41 in their holders 36 and 42, and then the holders 36 and 42 are mounted on the metal frame by means of the self-tapping screws 38 and 43, respectively, in the holes 40 and 45, respectively, and adjusted to the proper setting before the main molding operation. The rigid plastic body 28 is molded on the frame in the mold cavity 54 (FIG. 9) defined between the lower mold part 55 and the movable upper mold part 56, between which the opposite mold parts 57 and 58 are also movable in and out as indicated by the arrows. Mold parts 55 and 56 have opposed side face forming surfaces 55a, 56a and the mold parts 57, 58 have edge face forming surfaces 57a, 58a. The metal frame is positioned in the mold cavity and the mold parts moved relative to each other and relative to the frame to press the side face forming surfaces against the outer faces 27a of the rails 27 and to press the edge face forming surface against the outer faces 27b of the rails 27 so that the rails on the frame control the size of the mold cavity. The side face forming surfaces 55a, 56a and the edge face forming surface 57a, 58a are preferably formed of a resilient mold making material such as silicone rubber, and the side and edge face forming surfaces are pressed against the outer faces of the rails with sufficient pressure to compress the portions that engage the rails and offset the portions of the face forming surfaces intermediate the rails slightly inwardly of the respective rails. The surfaces 55a, 56 a and 57a, 58a are also preferably textured to reproduce a wood grain effect on the plastic body 28. The resilient end caps 29 are positioned at opposite ends of the mold cavity to close the ends of the cavity. The plastic material for forming the rigid foamed plastic body 28 is introduced into the mold cavity from one side or from one end, before the closing that side or end of the cavity, or the material can be injected into a closed mold. The plastic material is preferably a high density rigid urethane foam reaction mixture such as the so called furniture grades used for making plastic furniture. The foam reaction mixture is selected to have a free rise density somewhat less than final density desired for the plastic body 28 and the quantity of the foamable material utilized for each molding operation is somewhat greater than that necessary to fill the mold cavity under free rise conditions so that a positive pressure is built up in the mold by the expanding resin to completely fill all voids in the mold cavity and to compress the cell structure at the outer surfaces of plastic body into a generally non-porous skin integral with the foamed core. The urethane foam molding process can be carried out at a low temperature and thus will not damage the glass level vials included in the preliminary assembly. It requires only a matter of a few minutes for the rigid urethane foam reaction mixture to solidify, whether it is poured in an open mold or injected in a closed mold and the level body can be removed from the mold as soon as the plastic sets. The windows 48 and 49 are preferably glued in place as the final step in the assembling of the levels.

In FIGS. 10 and 11 I have shown a variation in construction in which the vials and vial holders are assembled in the level after the molding operation is completed, this level 25' being otherwise similar to the level 25 of FIGS. 1–8 except for the fact that the metal frame 26'' happens to be of two-piece construction split through the center line thereof as seen at 50' in FIGS. 11 and 12, the two halves being fastened together by twist tabs 51 provided on tie plates 51' disposed in uniformly longitudinally spaced relationship along the two halves of the frame and which tabs when extended through slots and bent serve to secure the two halves of the frame in rigidly assembled relationship prior to the molding operation. Then in the molding of the rigid foamed urethane body material 52', circular openings 53' can be cored in the body for each of the vials 54', 55' and 56', disposed vertically, horizontally, and at a 45° angle, respectively, as shown. Alternatively, the openings 53' can be cut or milled into the body after the plastic hardens. Each of these vials is conveniently molded in a urethane ring or holder 57', and the holder then pressed or glued in the cored openings 53'. Plastic molded rings 58' are assembled inside the urethane rings 57' from opposite sides of the vial 55', and circular windows 59' are assembled in the annular shoulders 60' to enclose the vial 55' from opposite sides for good visibility and finally, plastic rings 61' are cemented in place around the windows 59' to complete the assembly, resulting in a construction closely similar to that of FIGS. 1–8, although not molded in quite the same way.

The levels 25' and 25'' offer practically the same advantages as the levels 25 at very little difference in cost.

The level 25'', shown in FIGS. 13 and 14, is another form in which the metal frame 25'' has a plastic body 52' preferably of high density rigid foamed urethane molded therein in the same manner as in level 25 of FIGS. 1–9 and the level 25' of FIGS. 11 and 12. In this embodiment, openings 53' for the vials 55' cored or otherwise formed in the plastic and the vials are mounted in the openings 53' after the plastic is molded on the frame. The vials can be cast in plastic holders 57' and the holders and vials finally set and accurately calibrated when assembled in the openings 53' or the vials can be positioned in the openings 53' and set by cement, plastic or the like.

Figures 18, 19, 20:
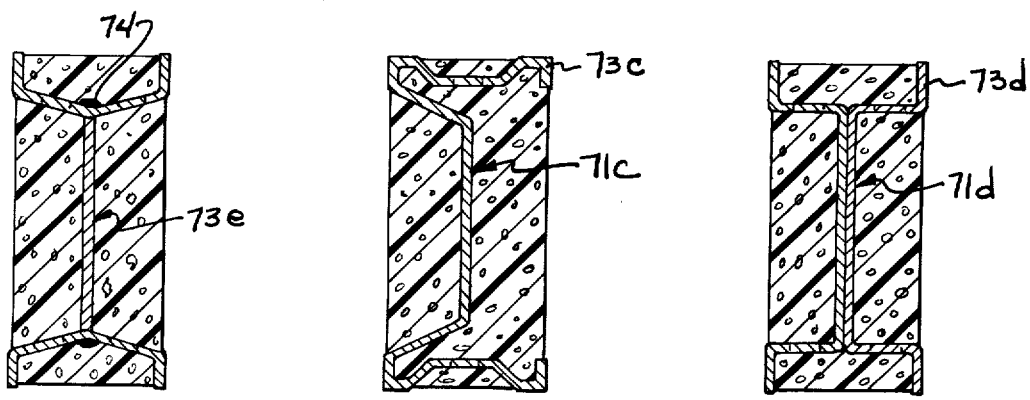

FIGS. 16–20 illustrate variations in the metal frames that may be used for levels of the present type. Thus, metal frames 71a and 71b shown in FIGS. 16 and 17, respectively, are one-piece extrusions on which the urethane or other rigid foamed plastic material, indicated at 72a, 72b, respectively, is molded leaving exposed at the four corners of the body the metallic corners 73a, 73b. A one-piece extrusion or stamping is shown at 71c in FIG. 18, where again there are exposed the four metal corners 73c. At 71d in FIG. 19 are shown two extrusions or stampings also providing the metallic corners 73d. The two pieces 71d may be riveted or otherwise suitably secured together. The frame 71e shown in FIG. 20 is of three-piece construction using stampings or extrusions for the two upper and lower pieces and a stamping or extrusion for the connecting middle piece that is shown as riveted at its upper and lower edges, as at 74.

The composite metal and plastic level of the present invention offers many advantages over either the prior all wood levels or the prior all metal levels. The composite metal and plastic level is more economical to manufacture and is not subject to warping due to moisture as in the case of all wood levels. On the other hand, the foamed plastic on the metal frame substantially encloses and supports the flanges on the metal frame. This not only provides a level body with the generally rectangular shape and feel of wood level, but also reduces the damage of bending or deforming the level due to impact. Moreover, the plastic provides good thermal insulation so that the level is comfortable to handle even in cold weather. The outer faces of the plastic are offset from the outer faces of the rails so that the latter define accurate work engaging surfaces and protect the plastic from wear.

In each of the several forms of frames illustrated, the vials can be mounted with their holders on the frame prior to molding of the plastic on the frame as disclosed in the embodiment of FIGS. 1-8 or the vials and their holders may be assembled in openings cored or otherwise formed in the plastic body of the level after the plastic is molded on the frame in the manner similar to that described in connection with FIGS. 10 and 14. The plastic body on the metal frame provides improved support for the level vials, whether they are mounted in vial holders on the metal frame before molding of the plastic body, as described in connection with FIGS. 1-8, or the vials are mounted on the plastic body as described in connection with FIGS. 10-14.

It is believed the foregoing description conveys a good understanding of the objects and advantages of my invention. While preferred embodiments of the invention have beeen illustrated and described, this is only for the purpose of illustration, and it is to be understood that various modifications in structure will occur to a person skilled in this art.

I claim:

1. In a level having an elongated level body of generally rectangular cross section with a pair of relatively parallel edge faces and a pair of relatively parallel side faces and at least one level vial mounted on the level body in predetermined relationship to the edge faces of the level body, the improvement wherein the level body comprises an elongated metal frame having four relatively parallel rails arranged in a transversely rectangular array and internal metal web structure interconnecting the four rails and spaced inwardly of the rectangular array to define a longitudinal channel at each of the four sides of the array, the rails each having a pair of outer faces at right angles to each other and arranged to form the four lengthwise extending corners of the level body and said rails each having a width measured along each of said pair of outer faces thereof in a line perpendicular to their length which is greater than the thickness of the respective flanges to provide a transversely enlarged portion along the outer edges of each flange, the web structure having openings therein interconnecting the channels, a unitary body of rigid foamed plastic having sections thereof substantially filling the channels at each of the four sides of the array with adjacent body sections interconnected through said openings in the web structure of the frame, the outer faces of the body sections in each channel being offset inwardly from the outer faces of the respective rails such that the outer faces of the rails form the work contacting surfaces of the level body.

2. A level according to claim 1 wherein said internal web structure includes a central web generally paralleling one pair of opposed sides of the array and four longitudinal flanges each extending laterally from the central web to a respective corner rail, said openings in said web structure including openings at spaced locations along each of said four flanges between adjacent ones of said channels, the unitary body of rigid foamed plastic having portions extending through said openings in said flanges and interconnecting adjacent sections of the plastic body.

3. A level according to claim 2 wherein said central web has an enlarged opening extending therethrough intermediate the ends of the frame, said unitary body of rigid foamed plastic having portions extending through said enlarged opening and interconnecting said sections of the unitary plastic body at said one pair of opposed sides of the rectangular array, and the sections of the plastic body at said one pair of opposed sides of the array having a through opening extending between said one pair of opposed sides of the array in alignment with said enlarged opening in the central web of the frame and of smaller size than said enlarged opening in the central web.

4. A level according to claim 1 wherein said web structure includes a central web generally paralleling one pair of opposed sides of the array and four longitudinal flanges each extending laterally from the central web to a respective rail, said central web having enlarged openings extending therethrough intermediate the ends of the frame, said unitary body of rigid foamed plastic having portions extending through said enlarged opening and interconnecting the sections of the unitary plastic body at said one pair of opposed sides of the rectangular array and said interconnected sections of the plastic body having a through opening extending between said one pair of opposed sides of the array in alignment with said enlarged opening in the central web of the frame and of smaller size than said enlarged opening in the frame.

5. A level according to claim 4 wherein said level vial is mounted in said through opening.

6. A level according to claim 4 including vial holder means for supporting the level vial defining an annular vial holder frame smaller than said enlarged opening in the central web and having opposed end faces, means mounting the vial holder on said central web with said vial holder frame extending through said enlarged opening and with said end faces paralleling said central web, said body of plastic extending around the outer periphery of said vial holder frame and having openings registering with opposite end faces of said vial holder frame.

7. A level according to claim 4 wherein said through opening is elongated in a direction lengthwise of the frame to provide a hand opening in the level body.

8. A level according to claim 4 wherein said longitudinal flanges have openings therethrough at spaced locations therealong between adjacent channels, the unitary body of foamed plastic having portions extending through said openings in said flanges and interconnecting the adjacent sections of the plastic body.

9. A level according to claim 1 wherein said internal web portion includes a central web generally paralleling one pair of opposed sides of the array and four longitudinal flanges extending laterally from the central web to the respective corner rail.

10. A level according to claim 1 wherein said rigid foamed plastic is rigid high density urethane foam having an essentially non-cellular skin at its outer faces.

11. A level according to claim 1 wherein said rigid foamed plastic has a density in a range of about 20 to 20 pounds per cubic foot.

12. In a level having an elongated level body of generally rectangular cross section with a pair of relatively parallel edge faces and a pair of relatively parallel side faces and at least one level vial mounted on the level body in predetermined relationship to the edge faces of the level body, the improvement wherein the level body comprises an elongated metal frame having four relatively parallel rails arranged in a transversely rectangular array and internal metal web structure interconnecting the four rails and spaced inwardly of the rectangular array to define a longitudinal channel at each of the four sides of the array, the rails each having a pair of outer faces at right angles to each other and arranged to form the four lengthwise extending corners of the level body, the web structure having openings therein interconnecting the channels, a unitary body of rigid foamed plastic having sections thereof substantially filling the channels at each of the four sides of the array with adjacent body sections interconnected through said openings in the web structure of the frame, the outer faces of the body sections in each channel being offset inwardly from the outer faces of the respective rails such that the outer faces of the rails form the work contacting surfaces of the level body, said rails defining grooves that undercut the outer faces thereof and open into the adjacent channels, and said body of plastic fills said grooves to mechanically key said sections of the body of plastic to the metal frame.

13. A level having an elongated level body of generally rectangular cross section with a pair of relatively parallel edge faces and a pair of relatively parallel side faces comprising an elongated metal frame having four relatively parallel rails arranged in a transversely rectangular array and internal web portions rigidly interconnecting the four rails and spaced inwardly of the rectangular array to define a longitudinal channel at each of the four sides of the array, the rails each having a pair of outer faces at right angles to each other and arranged to form the four lengthwise extending corners of the level body, the internal web portion including a central web generally paralleling one pair of opposed sides of the array and four longitudinal flanges each extending laterally from the central web to a respective corner rail, said rails each having a width measured along each of said pair of outer faces thereof in a line perpendicular to the length which is greater than the thickness of the respective flange to provide a transversely enlarged portion along the outer edges of each flange, said flanges having longitudinal spaced openings therethrough between adjacent ones of said channels, said central web having at least one enlarged opening therethrough interconnecting the channels at said one pair of opposed sides of the array, a body of foamed plastic having sections thereof filling the channels at each of the four sides of the array and portions extending through said openings in said flanges and said enlarged opening in the central web to interconnect the body sections in adjacent channels, the sections of the plastic body in the channels at said one pair of opposed sides of the array having a through opening extending between said one pair of opposed sides of the array in alignment with said enlarged opening in the central web and at least one level vial mounted in said through opening in said body.

14. A level according to claim 13 including pads of resilient material overlying the ends of said metal frame, and means on said pads anchoring the same in said body of plastic.

* * * * *

UNITED STATES PATENT OFFICE
CERTIFICATE OF CORRECTION

PATENT NO. : 3,921,306
DATED : November 25, 1975
INVENTOR(S) : Mike A. Provi

It is certified that error appears in the above-identified patent and that said Letters Patent are hereby corrected as shown below:

Claim 11, column 8, line 64, "20" should be -- 30 --.

Signed and Sealed this twenty-third Day of March 1976

[SEAL]

Attest:

RUTH C. MASON
Attesting Officer

C. MARSHALL DANN
Commissioner of Patents and Trademarks